United States Patent
Li et al.

(10) Patent No.: US 8,300,084 B2
(45) Date of Patent: Oct. 30, 2012

(54) METHOD FOR REAL-TIME PROMPTING STITCHING DEGREE OF PANORAMIC IMAGE

(76) Inventors: Yun-Chin Li, Banciao (TW); Chin-Lung Yang, Miaoli County (TW)

( * ) Notice: Subject to any disclaimer, the term of this patent is extended or adjusted under 35 U.S.C. 154(b) by 480 days.

(21) Appl. No.: 12/620,205

(22) Filed: Nov. 17, 2009

(65) Prior Publication Data

US 2010/0141737 A1    Jun. 10, 2010

(30) Foreign Application Priority Data

Dec. 5, 2008  (TW) ................................ 97147559 A

(51) Int. Cl.
*H04N 7/00* (2006.01)
(52) U.S. Cl. ............................................. 348/36; 348/37
(58) Field of Classification Search .................... 348/36, 348/208.99, 231.99, 218.1, 37; 382/284
See application file for complete search history.

(56) References Cited

U.S. PATENT DOCUMENTS

| | | |
|---|---|---|
| 7,050,085 B1 | 5/2006 | Park et al. |
| 7,289,147 B2 | 10/2007 | Webb |
| 2007/0200926 A1 | 8/2007 | Chianglin |
| 2008/0043093 A1 | 2/2008 | Song |
| 2008/0074506 A1* | 3/2008 | Oh et al. ..................... 348/218.1 |
| 2008/0158342 A1* | 7/2008 | Jeong et al. ..................... 348/36 |
| 2008/0180550 A1* | 7/2008 | Gulliksson ............... 348/231.99 |
| 2008/0252717 A1* | 10/2008 | Moon et al. ..................... 348/36 |
| 2008/0266408 A1 | 10/2008 | Kim |
| 2008/0298718 A1* | 12/2008 | Liu et al. ........................ 382/284 |
| 2009/0058990 A1* | 3/2009 | Kim et al. ......................... 348/36 |
| 2009/0153685 A1* | 6/2009 | Son et al. ................. 348/208.99 |

* cited by examiner

*Primary Examiner* — Le H Luu

(74) *Attorney, Agent, or Firm* — Apex Juris, pllc; Tracy M Heims

(57) ABSTRACT

A method for real-time prompting a stitching degree of a panoramic image applied to a digital image pickup device. At first, a boundary band of a first image is captured to obtain an boundary image, and a second image is detected. Next, the boundary image and a local image of the second image are merged, and an association value of the boundary image and the local image of the second image is calculated. Then, the second image after being merged with the boundary image and a prompt signal corresponding to the association value are displayed on a screen.

7 Claims, 14 Drawing Sheets

METHOD FOR REAL-TIME PROMPTING STITCHING DEGREE OF PANORAMIC IMAGE

CROSS-REFERENCE TO RELATED APPLICATIONS

This non-provisional application claims priority under 35 U.S.C. §119(a) on Patent Application No(s). 097147559 filed in Taiwan, R.O.C. on Dec. 5, 2008, the entire contents of which are hereby incorporated by reference.

BACKGROUND OF THE INVENTION

1. Field of Invention

The present invention relates to a photography method, and more particularly to a method for real-time prompt of a stitching degree of a panoramic image.

2. Related Art

Generally speaking, in panoramic image photography, a user mostly moves the digital image pickup device manually in sequence and shoots pictures in sequence to obtain multiple images. When shooting, the user must adjust the viewing location such that the multiple images all have overlapping portions. Then the user transfers these images from the digital image pickup device to a computer, and carries out image composition of these images having the overlapping portions on the computer. Here, image processing software installed on the computer is utilized to stitch the overlapping portions of these images together to produce a panoramic image.

However, specific image processing software is used to stitch the images to produce the panoramic image. In this way, the user has to not only install such image processing software on the computer, but also learn how to use the image processing software. Further, functions of the image processing software are considerable complicated, and the user may not have the knowledge and capability required. Therefore, this approach is quite difficult for users.

Furthermore, in the method of adjusting the viewing locations by the user, the user needs more professional shooting skills, and should have the image recognition capability to some extent; otherwise, subsequent image stitching will be more difficult, or the effect of image stitching will be poor.

As described above, a common digital image pickup device is unable to provide the users with an easy and convenient approach to shoot panoramic images, making panoramic shooting not easy for users.

U.S. Pat. No. 7,289,147 and No. 7,050,085, and US Patent Application No. 20070200926, 20080043093 and 20080266408 may be referenced for relevant techniques and studies.

SUMMARY OF THE INVENTION

Accordingly, the present invention is directed to a method for real-time prompting a stitching degree of a panoramic image, thereby solving the problem that a panoramic shooting method of the prior art lacks an effective shooting mode, and often results in a failure when a panoramic photo is shot.

The method for real-time prompting a stitching degree of a panoramic image of present invention is applied to a digital image pickup device. The digital image pickup device stores a first image shot previously.

Here, a boundary band of the first image is captured to obtain an boundary image.

A second image is detected.

The boundary band image is merged with a local image of the second image.

The merged second image is displayed on a screen of the digital image pickup device. The boundary band image is displayed overlapping the local image of the second image.

An association value of the overlapping of the previous boundary band image and the local image is calculated.

A prompt signal corresponding to the association value is displayed on the screen of digital image pickup device.

The step of capturing the boundary band of the first image to obtain the boundary image may include following steps. The first image section is divided into a plurality of image blocks, and an image component of each image block is quantified into a feature value. The quantified feature values are accumulated in a sequence starting from the most boundary of the first image to obtain an accumulative value. The image blocks corresponding to the accumulated feature values are merged into the boundary band image according to the accumulative value.

The image components may be a high frequency component or a feature component. The feature component may be an edge, a line, or an acute angle etc.

The step of merging the image blocks corresponding to the accumulated feature values into the boundary image according to the accumulative value may include the following step. The image blocks of the accumulated feature values are merged into the boundary image when the accumulative value reaches a predetermined value.

The step of calculating the association value of the boundary image with the local image may include following steps. Feature points of the boundary image and the local image are analyzed. The feature point of the boundary image is compared with the feature point of the local image, so as to obtain the same feature point between the boundary image and the local image. The association value is generated according to the same feature value obtained through comparison.

In addition, the step of calculating the association value of the boundary image with the local image may include the following steps. A column of pixels of the local image is obtained, and a column of pixels in the boundary image corresponding to the obtained column of pixels of the local image is also obtained. Then, a pixel value of each pixel in the obtained column of pixels in the local image is compared with a pixel value of the corresponding pixel in the obtained column of pixels in the boundary image. Then, comparison results of the pixel values are counted to obtain the association value of the boundary image with the local image. The obtained column of pixels of the boundary image overlaps the obtained column of pixels of the local image when the obtained column of pixels of the boundary image is displayed on a screen after being merged.

The step of merging the boundary image and the local image may include the following steps. The boundary image is converted into a monochromatic and semi-transparent image, and the monochromatic boundary image is blended with the local image.

As described above, when the method for real-time prompting a stitching degree of a panoramic image according to the present invention is applied to a digital image pickup device, in shooting, the digital image pickup device can display a prompt signal to provide a user with a message about a stitching degree between a previous image and an image to be shot, so as to increase success possibility of subsequent panoramic image generation, and greatly decrease failure possibility when a user shoots panoramic images.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below. Those skilled in the art can understand the technical content of the present invention and implement the method according to the following description, and those skilled in the art can easily understand purposes and advantages of the present invention according the disclosure in the specification, the claims and the drawings.

Figure 1:
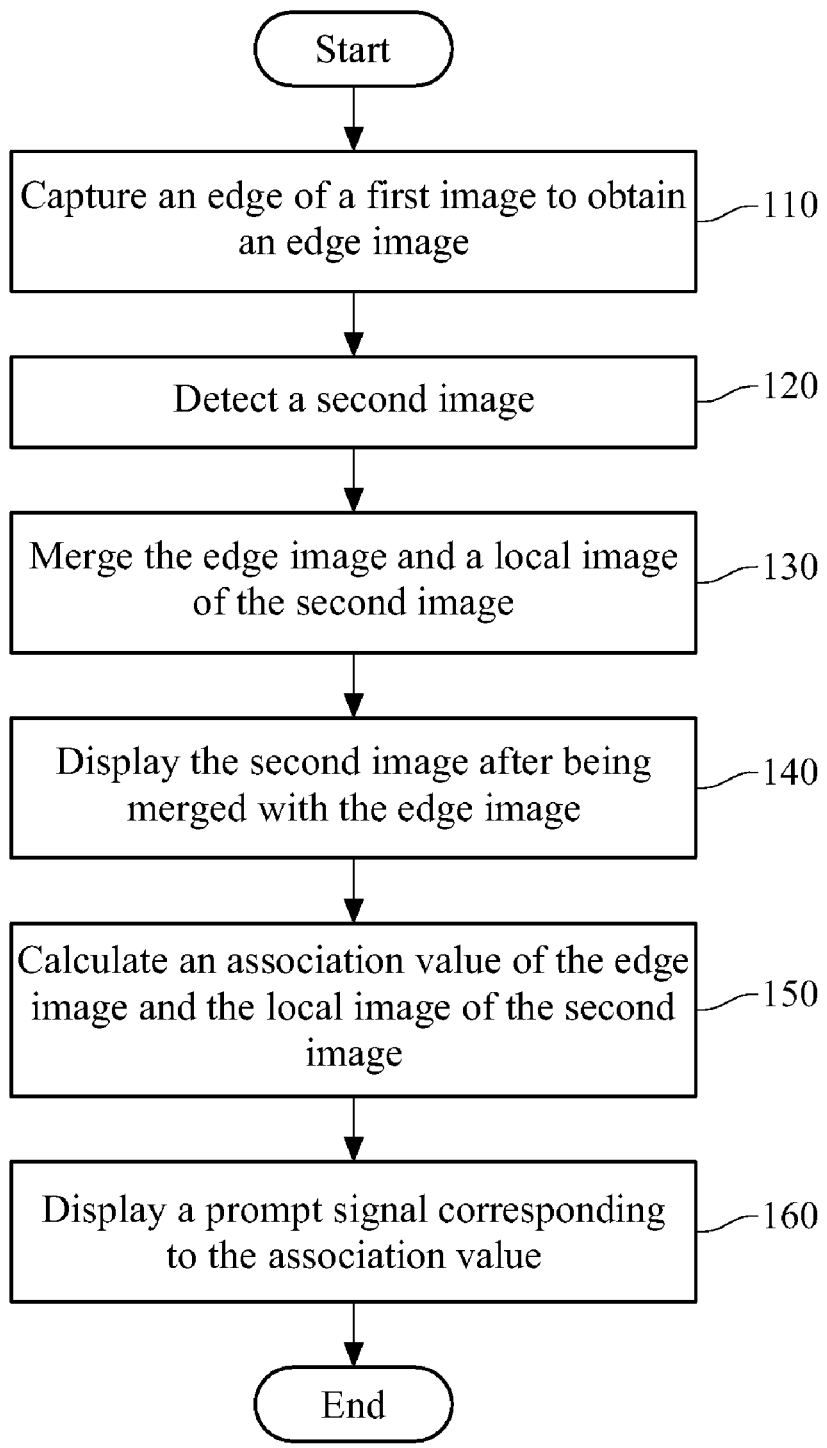
FIG. 1 is a flow chart of the method for real-time prompting a stitching degree of a panoramic image according to a first embodiment of the present invention.

FIG. 1 is a flow chart of the method for real-time prompting a stitching degree of a panoramic image according to an embodiment of the present invention.

The method for real-time prompting a stitching degree of a panoramic image is applied to a digital image pickup device 10, and can assist a user in panoramic photography.

Figure 2A:
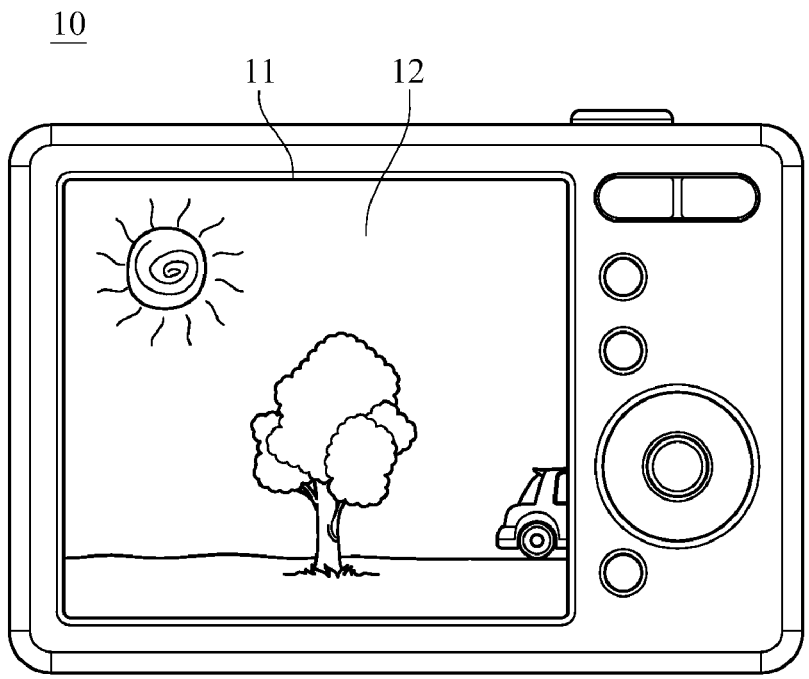
FIG. 2A is a schematic view of displaying a first image in the method for real-time prompting a stitching degree of a panoramic image according to an embodiment of the present invention.

A first image 12 shot previously is stored in the digital image pickup device 10, as shown in FIG. 2A.

Figure 2B:
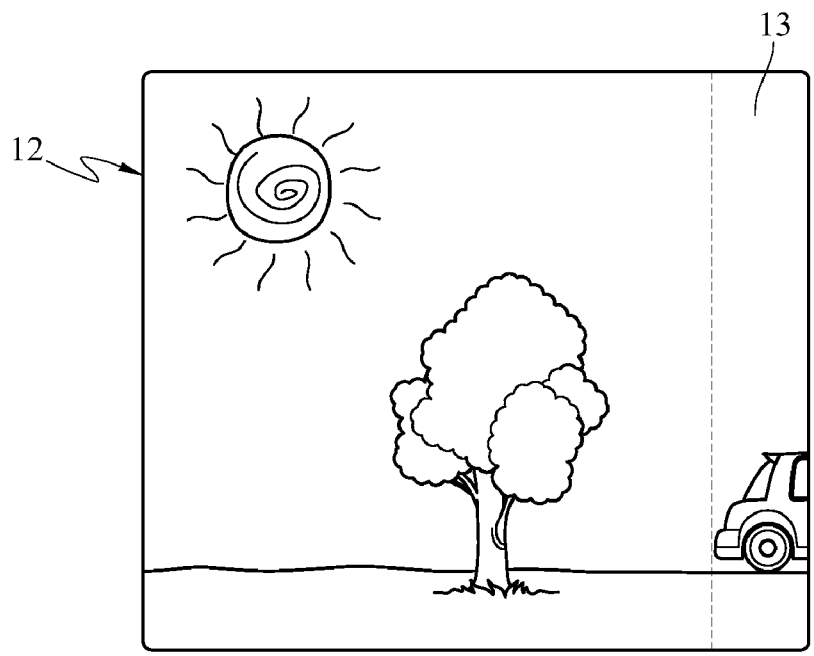
FIG. 2B is a schematic view of a first image and a boundary image in the method for real-time prompting a stitching degree of a panoramic image according to an embodiment of the present invention.

Referring to FIGS. 1 and 2B, the digital image pickup device 10 will capture an boundary band of the first image 12 to obtain a boundary image 13 (step 110).

Then, the digital image pickup device 10 detects an image to be shot in the front as a second image 14 (step 120).

The boundary image 13 is merged with a local image 15 of the second image 14 (step 130). The second image 14 after being blended with the boundary band image 13 is displayed on a screen 11 (step 140), as shown in FIG. 3B.

The local image 15 of the second image 14 is an image of an overlapping area of the second image 14 and a semitransparent boundary image 13' on the screen. In other words, the boundary image 13 overlaps the local image 15 of the second image 14 on the screen 11, that is, the semitransparent boundary image 13' can be seen at the local image 15 of the second image 14 on the screen 11. For example, the boundary band image 13 may appear over the local image 15 of the second image 14 at a transparence higher than 50%.

Here, the pixel value of the boundary band image 13 can be halved, and the pixel value of the local image 15 of the second image 14 may be halved. Then, add each pixel of the halved boundary image 13 to corresponding pixel of the halved local image 15, so as to obtain the second image 14 after being merged with the boundary image 13. In other words, the boundary image 13 and the local image 15 are located at the same area of the second image 14 after the merging.

Figure 3A:
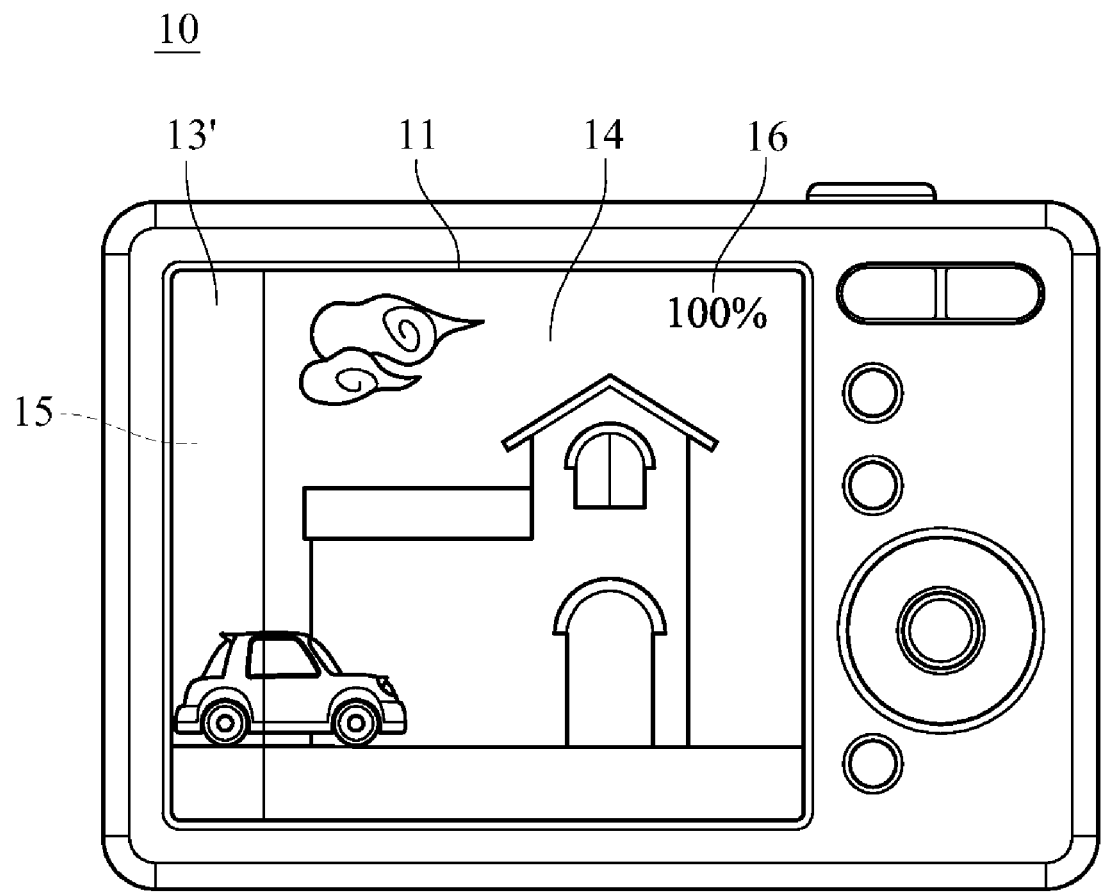
FIG. 3A is a schematic view of displaying a boundary image, a second image, and a prompt signal in the method for real-time prompting a stitching degree of a panoramic image according to an embodiment of the present invention.
Figure 3B:
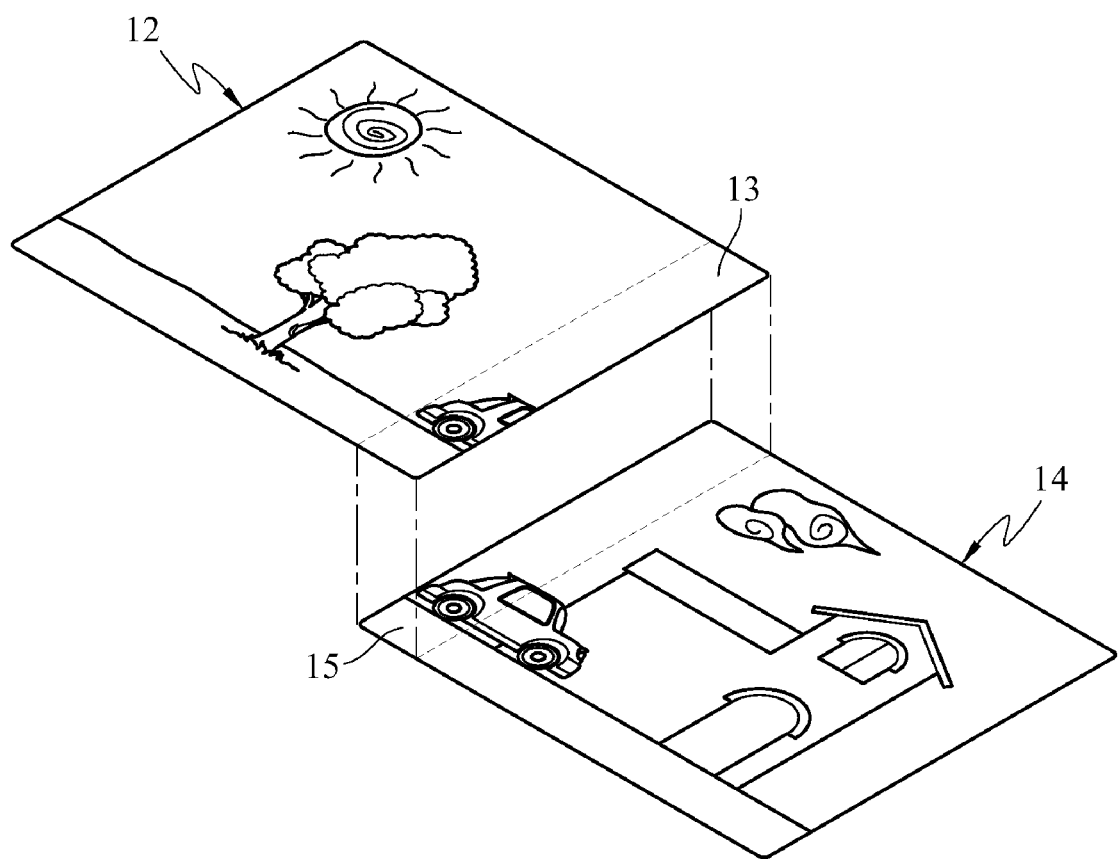
FIG. 3B is a schematic view of the corresponding relationship between a first image and a second image in the method for real-time prompting a stitching degree of a panoramic image according to an embodiment of the present invention.

Referring to FIG. 3B, the boundary image 13 of the first image 12 and the local image 15 of the second image 14 can be used as an image area for subsequent merging of the first image 12 with the second image 14. In other words, on the screen 11, the semitransparent boundary image 13' may overlap an image to be merged (i.e., the local image 15) at the boundary of the second image 14. That is, the size of the boundary image 13 of the first image 12 is the same as the size of the local image 15 of the second image 14.

Referring to FIGS. 1 and 3A again, the digital image pickup device 10 will now calculate an association value of the boundary image 13 and the local image 15 of the second image 14 (step 150), and display a prompt signal 16 corresponding to the association value on the screen 11 (step 160).

The steps 110 to 160 are described above in sequence; however, the present invention is not limited to the above sequence. In actual operation, the sequence of performing the steps above may be adjusted properly with reference to capabilities of the built-in processor and software design of the digital image pickup device 10.

Figure 4:
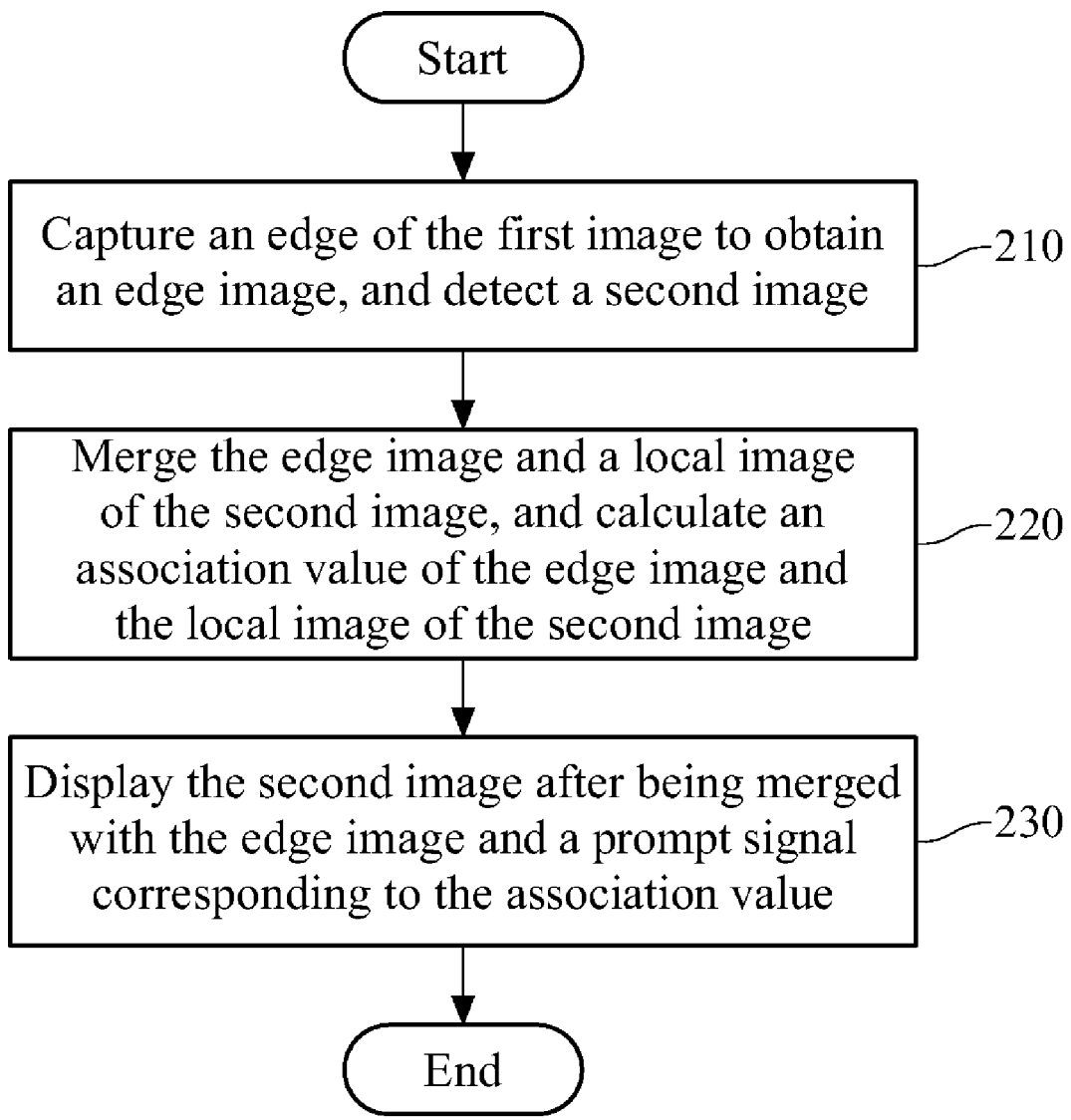
FIG. 4 is a flow chart of the method for real-time prompting a stitching degree of a panoramic image according to a second embodiment of the present invention.

For example, referring to FIG. 4, firstly, the boundary band of the first image 12 is captured to obtain the boundary image 13, and the second image 14 is detected (step 210). In other words, capturing the boundary band image 13 and detecting the second image 14 may be performed simultaneously. Alternatively, the second image 14 is detected firstly, and the boundary image 13 will be captured later.

Next, the boundary image 13 and the local image 15 are merged, and the association value of the boundary image 13 and the local image 15 of the second image 14 is calculated (step 220). In other words, the merging and the association value calculation of the boundary image 13 and the local image 15 may be performed at the same time. Alternatively, the association value is calculated firstly, and the boundary image 13 and the local image 15 will be merged later.

At last, the second image 14 after being merged with the boundary image 13 and the prompt signal 16 corresponding to the association value are displayed on the screen 11 (step 230). In other words, the second image 14 and the prompt signal 16 may by displayed at the same time, or in sequence.

The prompt signal 16 may be realized through percentage (as shown in FIG. 3B). The similarity between the boundary image 13 of the first image 12 and the local image 15 of the second image 14 is represented by a percentage value.

The prompt signal 16 may also be realized through a color block (not shown). The similarity between the boundary image 13 of the first image 12 and the local image 15 of the second image 14 is represented by a color block in different colors.

Furthermore, the prompt signal 16 may be realized through a simple value (not shown). For example, the similarity between the boundary image 13 of the first image 12 and the local image 15 of the second image 14 is represented by values 0-10.

However, a threshold value may also be preset. When the association value is smaller than the threshold value, the prompt signal 16 is displayed to inform the user of low similarity between the boundary image 13 of the first image 12 and the local image 15 of the second image 14. For example, when the similarity between the boundary image 13 of the first image 12 and the local image 15 of the second image 14 is low 90%, the screen 11 will display the prompt signal 16 represented by a symbol, a number, or the like indicating the low similarity.

Figure 5:
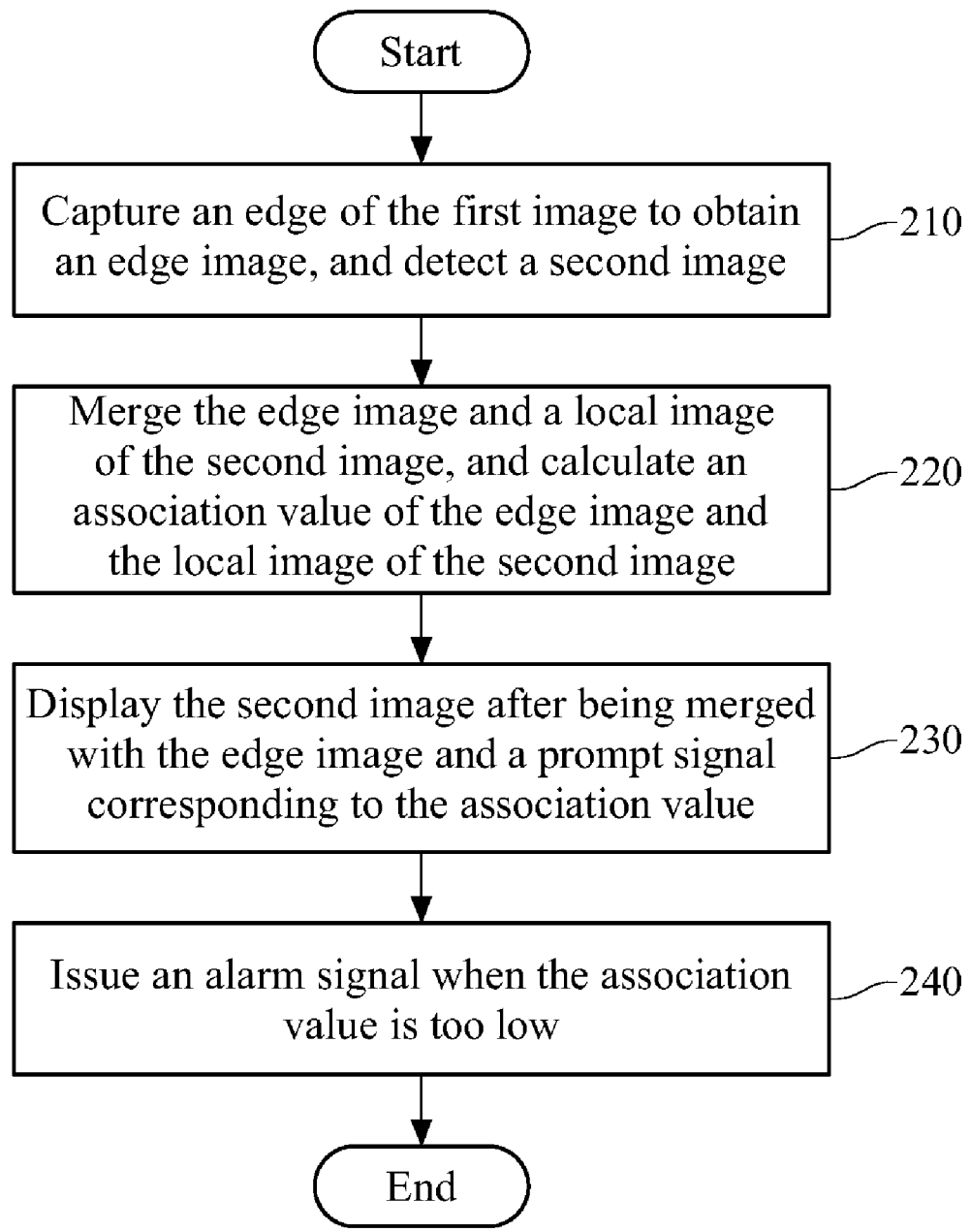
FIG. 5 is a flow chart of the method for real-time prompting a stitching degree of a panoramic image according to a third embodiment of the present invention.

Here, in addition to displaying the prompt signal 16, the digital image pickup device 10 may also issue an alarm signal when the association value is too low (e.g., lower the threshold value), so as to inform the user of the low similarity between the boundary image 13 of the first image 12 and the local image 15 of the second image 14 (step 240), as shown in FIG. 5. For example, the alarm signal may display information including text, symbol, or pattern or give out a sound directly to inform the user.

Figure 6:
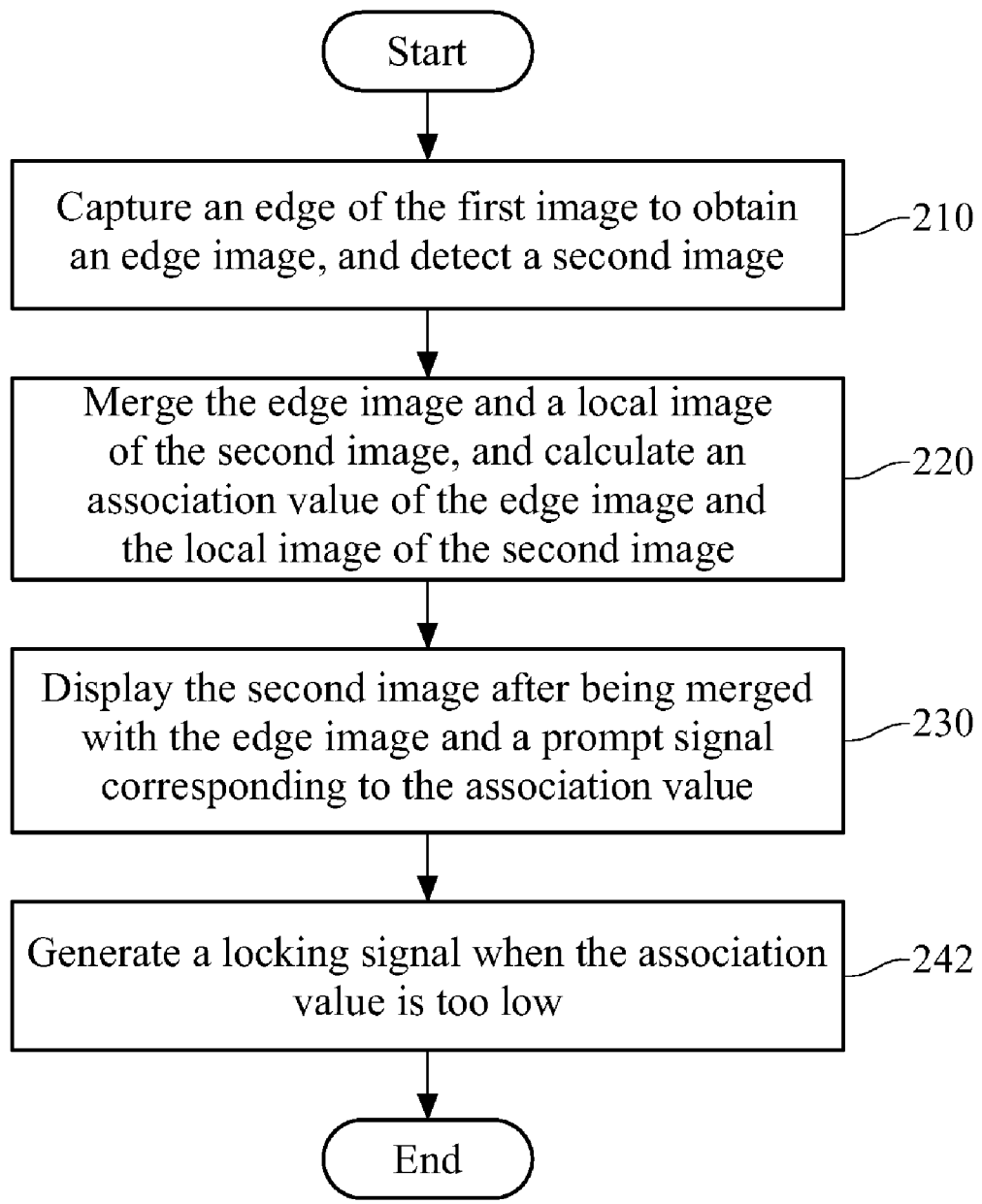
FIG. 6 is a flow chart of the method for real-time prompting a stitching degree of a panoramic image according to a fourth embodiment of the present invention.

Further, when the association value is too low (e.g., smaller than the threshold value), the digital image pickup device 10 may also generate a locking signal to lock an image pickup function of the digital image pickup device 10 (step 242), as shown in FIG. 6. In other words, when the association value is too low (e.g., smaller than the threshold value), because the image pickup function is locked in response to the locking signal, the user cannot perform the image pickup action.

Furthermore, the digital image pickup device 10 will remerge the boundary image 13 and the local image 15 of the second image 14 according to changes of the image to be shot in the front (that is, the second image 14), and recalculate the association value of the boundary image 13 of the first image 12 with the local image 15 of the second image 14. Subsequently, the second image 14 after being remerged and the prompt signal 16 corresponding to the recalculated association value are displayed on the screen 11.

Figure 7:
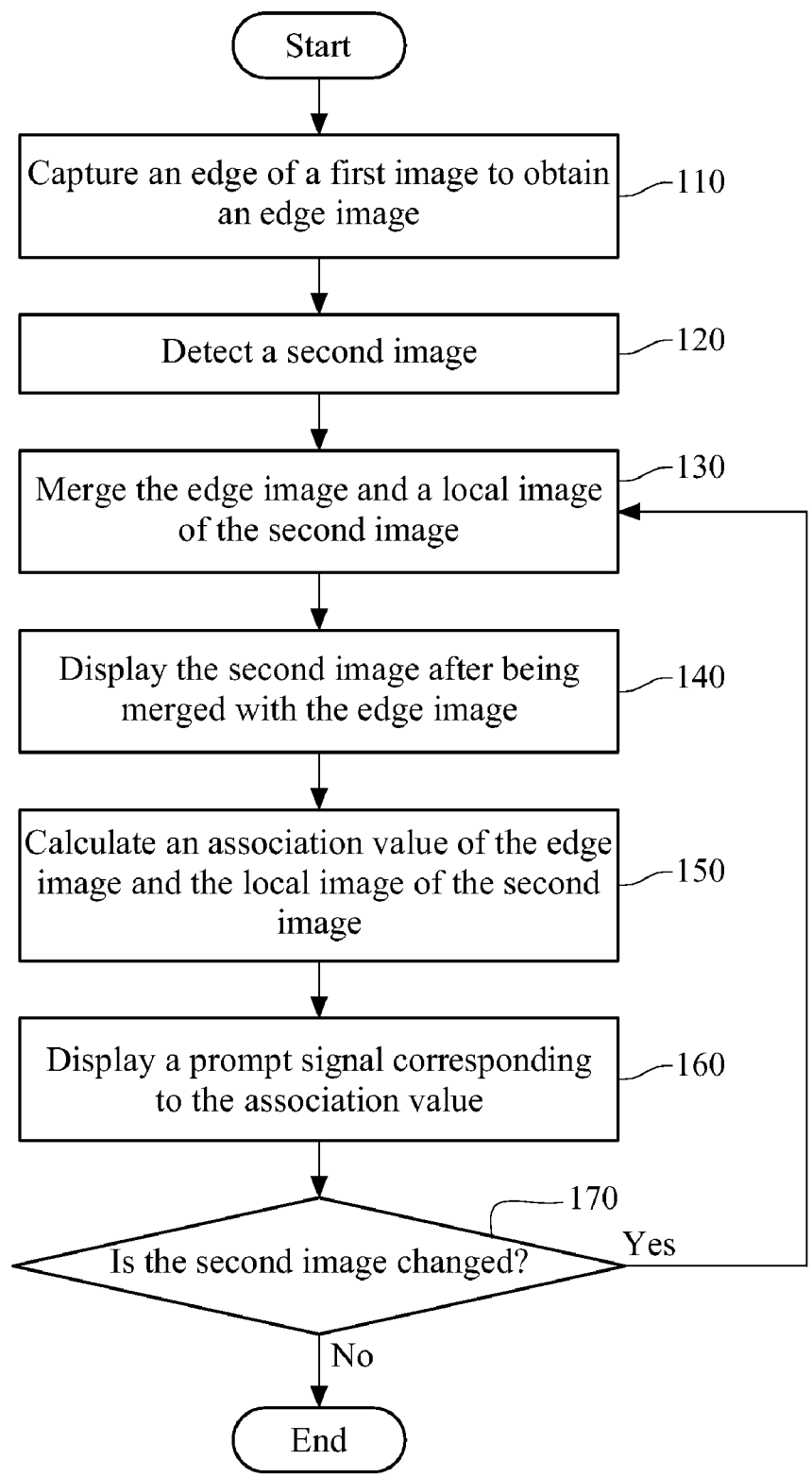
FIG. 7 is a flow chart of the method for real-time prompting a stitching degree of a panoramic image according to a fifth embodiment of the present invention.

Referring to FIG. 7, the digital image pickup device 10 detects the second image 14 continuously, so as to determine whether the second image 14 changes (step 170). When the second image 14 changes, return to step 130 to remerge the boundary image 13 and the local image 15 of the second image 14 to display the remerged second image 14 (step 140). Then, the association value of the boundary image 13 of the first image 12 and the local image 15 of the second image 14 is recalculated (step 150), so as to display the remerged second image 14 and the prompt signal 16 corresponding to the recalculated association value (step 160). Thus, when the digital image pickup device 10 moves the shooting location, the second image 14 will change accordingly, and the prompt signal 16 on the screen 11 will change according to the second image 14. Therefore, the user may determine a stitching effect of the first image 12 and the second image 14 through the prompt signal 16 displayed on the digital image pickup device 10, so as to decide the shooting location of the second image 14.

For example, when the user intends to perform panoramic shooting, the user switches a mode of the digital image pickup device 10 to a panoramic shooting mode. Then, the user may use the digital image pickup device 10 to shoot the first image 12, as shown in FIG. 2A. When the user needs to shoot a next image (i.e., the second image 14), the digital image pickup device 10 will capture the boundary image 13 of the first image 12. When the digital image pickup device 10 detects an image to be shot in the front (i.e., the second image 14), the boundary image 13 and the local image 15 of the second image 14 are merged. The image to be shot in front of the digital image pickup device 10 (i.e., the second image 14) and the semitransparent boundary image 13' overlapping the local image 15 of the second image 14 will appear on the screen 11 simultaneously, as shown in FIG. 3A. The digital image pickup device 10 will calculate the association value between the boundary image 13 of the first image 12 and the local image 15 of the second image 14, and then display the prompt signal 16 corresponding to the association value on the screen 11, as shown in FIG. 3A. When the user moves the digital image pickup device 10, the prompt signal 16 displayed on the digital image pickup device 10 will change with the image to be shot in the front (i.e., the second image 14).

Figure 8:
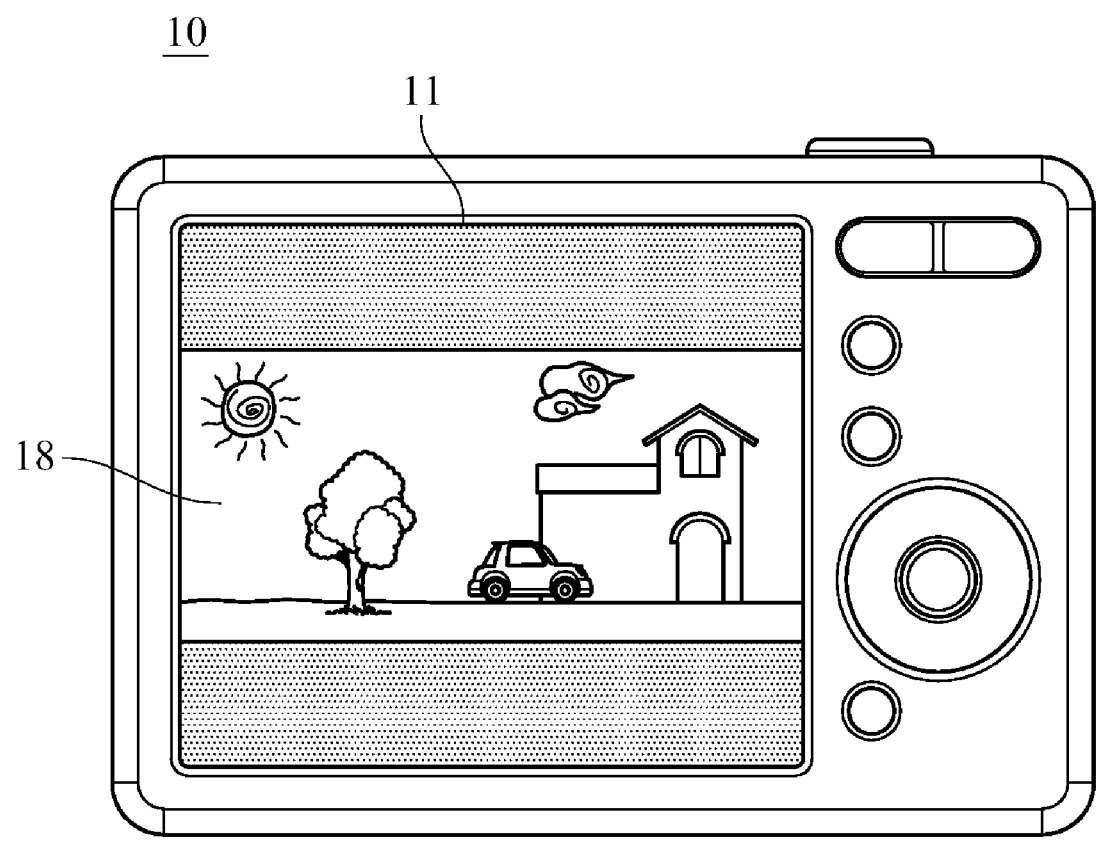
FIG. 8 is a schematic view of displaying a panoramic image in the method for real-time prompting a stitching degree of a panoramic image according to an embodiment of the present invention.

Therefore, the user may determine the stitching effect of the first image 12 and the second image 14 through the prompt signal 16 displayed on the digital image pickup device 10. For example, the prompt signal 16 appears to be 100%, indicating that the boundary image 13 of the first image 12 is extremely similar to the local image 15 of the second image 14. Therefore, in subsequent stitching, the possibility of successful merging of the first image 12 and the second image 14 is very high. In other words, the digital image pickup device applying the method for real-time prompting a stitching degree of a panoramic image according to the present invention may display the real-time prompt signal corresponding to the possibility of successful merging of the first image 12 and the second image 14, so as to assist the user in shooting block image (e.g., the first image 12 and the second image 14 described above) of each scenario when the user utilizes the digital image pickup device 10 to perform the panoramic shooting. After the user finishes shooting the block image of each scenario, the digital image pickup device 10 may merge all the shot block images into a panoramic image 18, as shown in FIG. 8.

The captured boundary image 13 may be decided by accumulating image components of the first image 12. In other words, the size of the boundary image 13 may be decided according to a feature status at the boundary of the first image 12.

Figure 9:
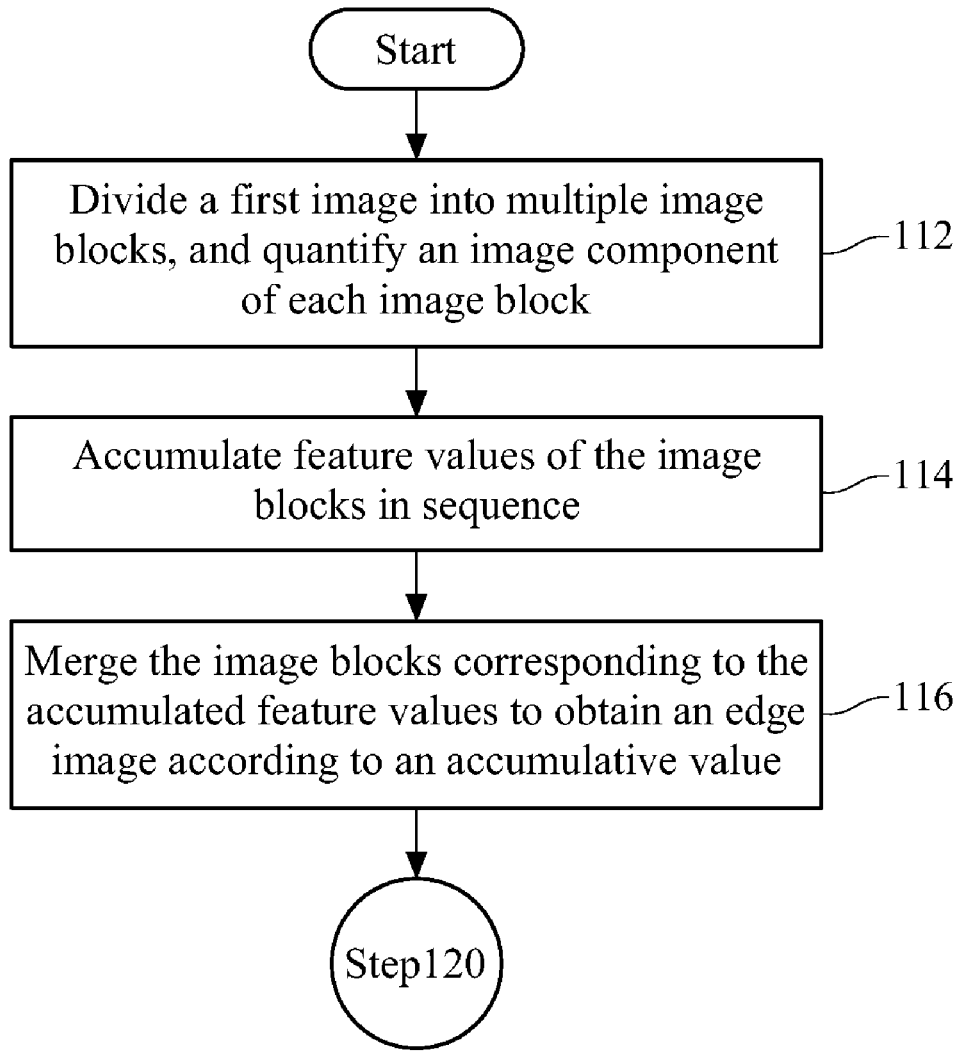
FIG. 9 is a flow chart of capturing a boundary band of a first image in the method for real-time prompting a stitching degree of a panoramic image according to an embodiment of the present invention.
Figure 10:
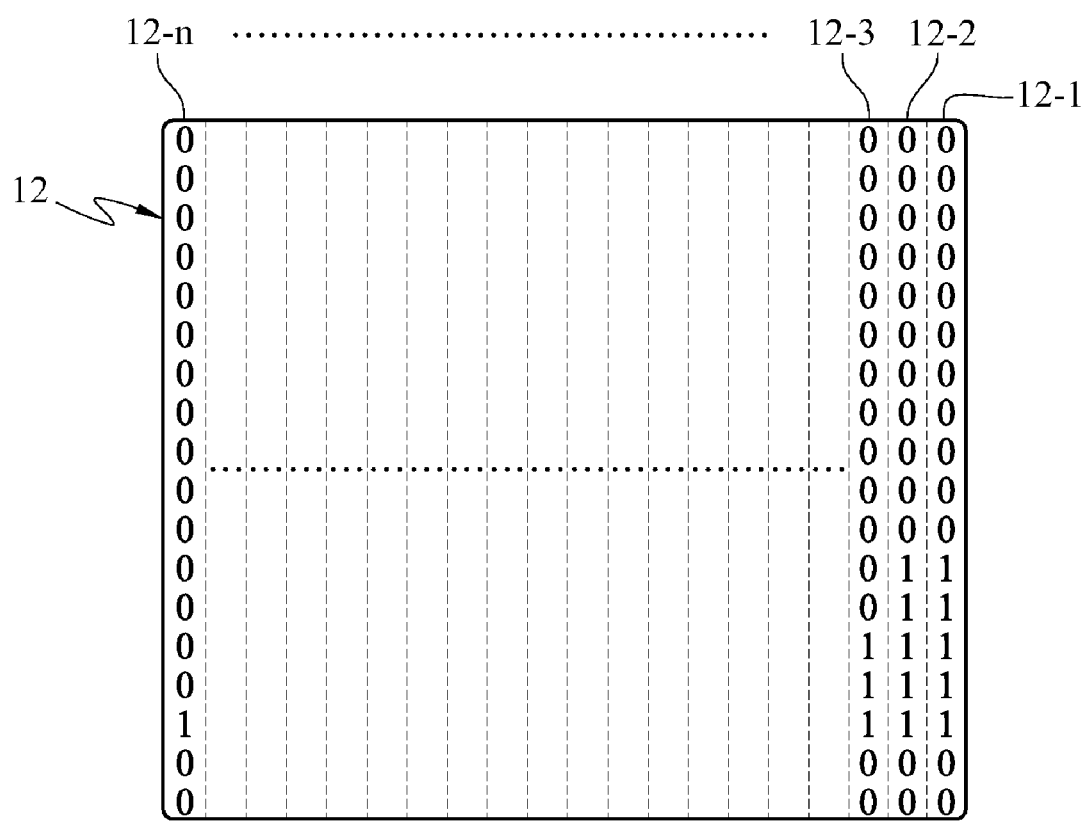
FIG. 10 is a schematic view of a quantified image block in the method for real-time prompting a stitching degree of a panoramic image according to an embodiment of the present invention.

Referring to FIGS. 9 and 10, the first image 12 is divided into multiple image blocks 12-1, 12-2, 12-3~12-n (the image blocks are referred to as 12' in the following for the convenience of illustration), an image component of each image block 12' is quantified into a feature value (e.g., '0' and '1' in FIG. 8) (step 112). Here, n is a positive integer. The image component may be a high frequency component or a feature component. The feature component may be features such as an edge, a line, and an acute angle.

Next, the feature values of the image blocks 12' are accumulated in a sequence starting from the boundary to obtain an accumulative value (step 114). For example, the feature values of the image blocks 12' may be accumulated in a sequence from right to left of the first image 12 in FIG. 8.

Subsequently, the image blocks 12' corresponding to the accumulated feature values are merged as the boundary image 13 of the first image 12 according to the accumulative value (step 116). A predetermined value has been preset in the digital image pickup device 10. After the feature values of the image blocks 12' are accumulated, the accumulative value is compared with the predetermined value. When the accumulative value is smaller than the predetermined value, continue accumulating the feature value of a next image block 12'. When the accumulative value reaches the predetermined value, the image blocks 12' corresponding to the feature values that are accumulated into the accumulative value are merged to a complete image, which is used as the boundary image 13. That is, when accumulating the feature values of the image blocks 12', the digital image pickup device 10 will record the accumulated image blocks 12' at first, so as to merge the accumulated image blocks 12' when the accumulative value reaches the predetermined value.

For example, the digital image pickup device 10 accumulates the feature value of the image block 12-1 to obtain a first accumulative value. When the first accumulative value does not reach the predetermined value, the digital image pickup device 10 continue adding the feature value of the image block 12-2 to the first accumulative value, so as to obtain a second accumulative value. When the second accumulative value does not reach the predetermined value, the digital image pickup device 10 continue adding the feature value of the image block 12-3 to the second accumulative value, so as to obtain a third accumulative value. When the third accumulative value reaches the predetermined value (that is, equal to or greater than the predetermined value), the digital image pickup device 10 merges the image blocks 12-1, 12-2, 12-3 to obtain the boundary image 13.

Figure 11:
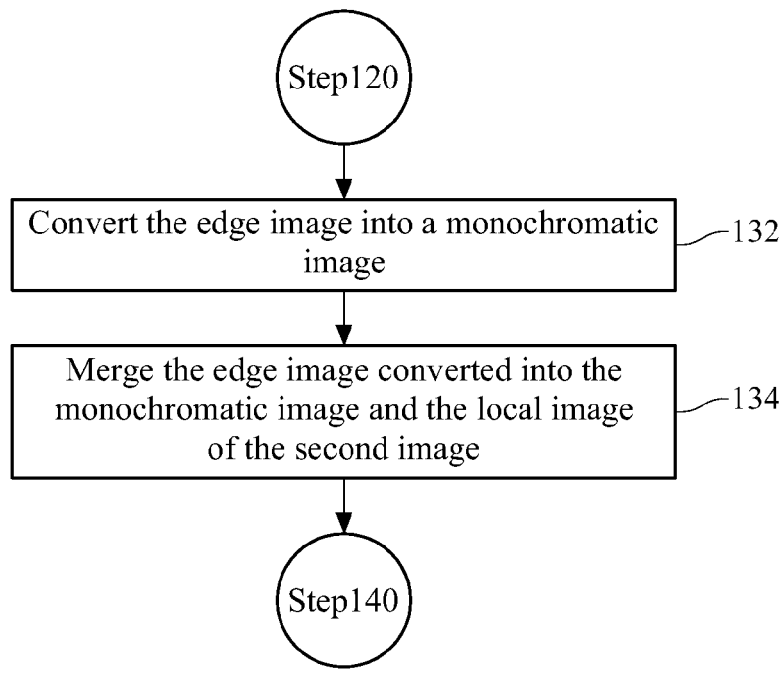
FIG. 11 is a flow chart of merging a boundary image and a local image in the method for real-time prompting a stitching degree of a panoramic image according to an embodiment of the present invention.

Moreover, the boundary image 13 may be expressed as a monochromatic image. Referring to FIG. 11, the digital image pickup device 10 converts the boundary image 13 of the first image 12 into a monochromatic image (step 132), and merges the monochromatic image converted from the boundary image and the local image 15 of the second image 14 (step 134). Then, the second image 14 after being merged with the boundary image 13 is displayed on the screen 11, that is, the second image 14 is displayed on the screen 11, and the semitransparent boundary image 13' appears on the second image 14 displayed at the boundary of the screen 11 (step 140).

Figure 12:
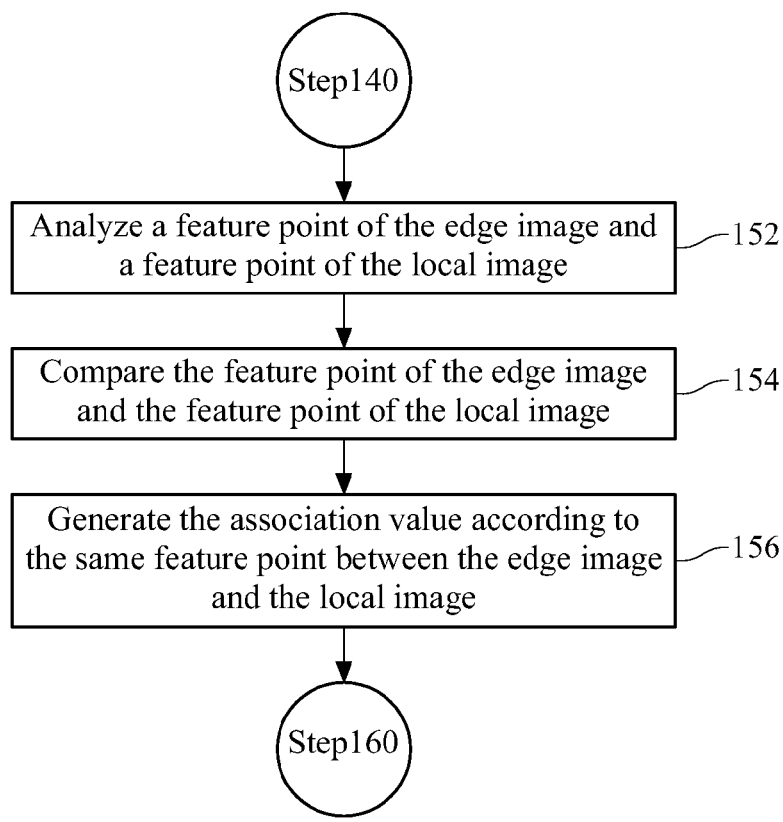
FIG. 12 is a flow chart of calculating an association value in the method for real-time prompting a stitching degree of a panoramic image according to a first embodiment of the present invention.

FIG. 12 is a flow chart of calculating an association value according to a first embodiment of the present invention.

Referring to FIG. 12, in the association value calculation, the digital image pickup device 10 will analyze a feature point of the boundary image 13 of the first image and a feature point of the local image 15 of the second image 14 (step 152).

The feature point of the boundary image 13 of the first image is compared with the feature point of the local image 15 of the second image 14, so as to obtain the same feature point between the boundary image 13 and the local image 15 (step 154).

The association value is generated according to the same feature point obtained in the comparison (step 156).

Furthermore, the association value may also be obtained by counting a column of pixels at the same locations of the boundary image 13 and the local image 15 of the second image 14 after overlapping (i.e., after the merging).

Figure 13:
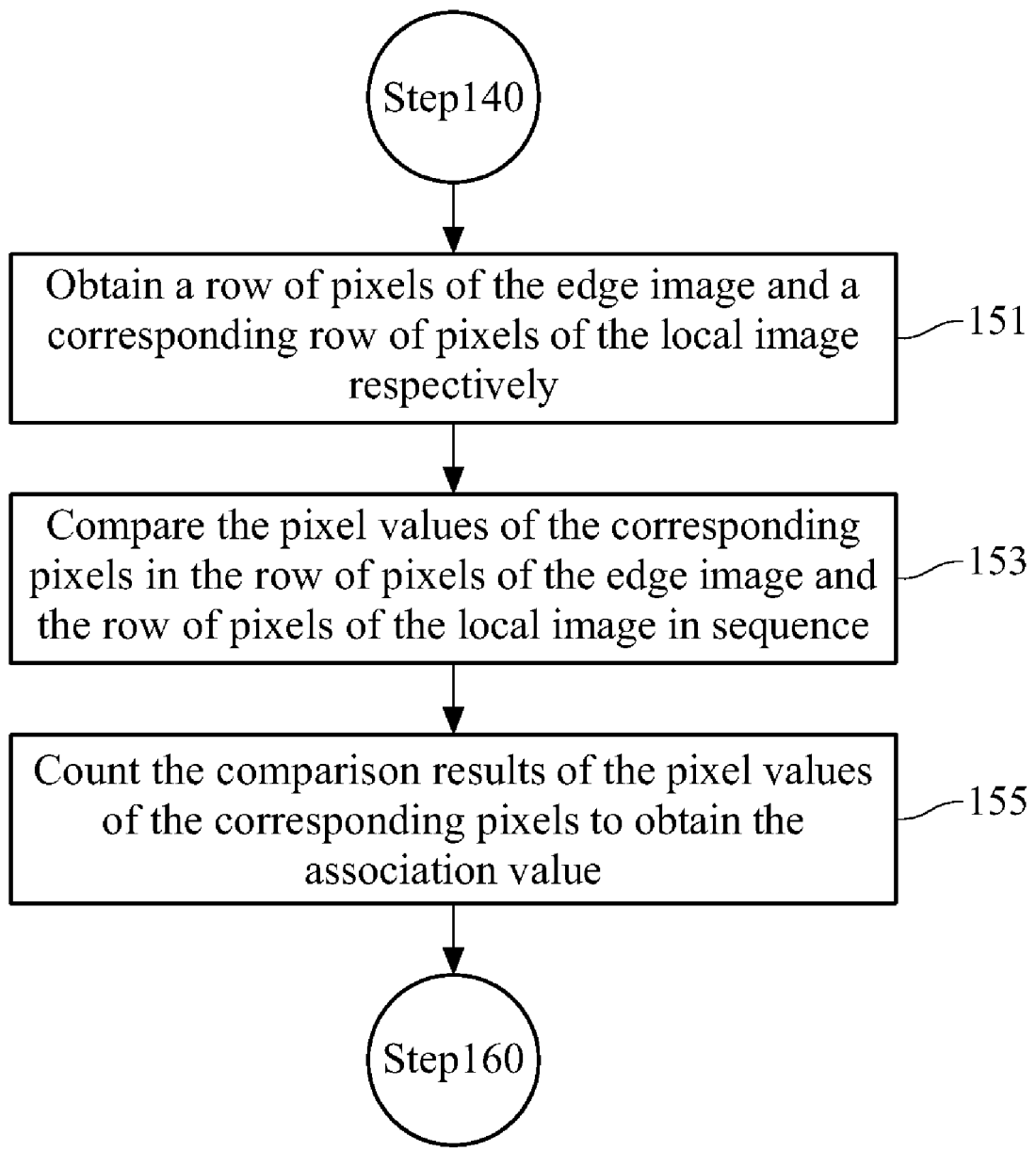
FIG. 13 is a flow chart of calculating an association value in the method for real-time prompting stitching degree of a panoramic image according to the second embodiment of the present invention.

FIG. 13 is a flow chart of calculating an association value according to a second embodiment of the present invention.

Figure 14:
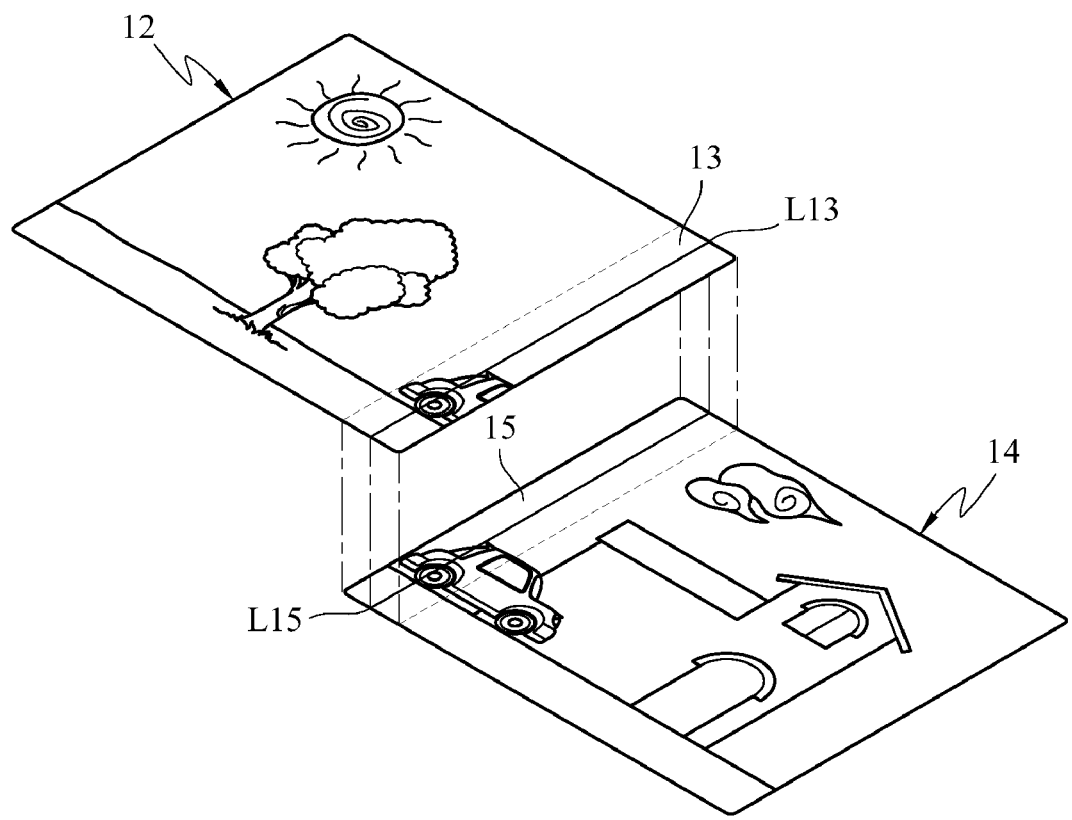
FIG. 14 is a schematic view of the corresponding relationship of a first image and a second image in the association value calculation according to the second embodiment of the present invention.

Referring to FIG. 13, a column of pixels L13 and a column of pixels L15 respectively in the boundary image 13 and the local image 15 corresponding to each other are obtained (step 151), as shown in FIG. 14. In other words, the column of pixels L13 of the boundary image 13 will be merged with the column of pixels of the local image 15. The semitransparent boundary image 13' and the second image 14 will be displayed on the screen 11 after the merging, with the column of pixels L13 of the semitransparent boundary image 13' overlapping the column of pixels of the local image 15. That is, the column of pixels L13 of the boundary image 13 and the column of pixels L15 of the local image 15 are at the same corresponding locations.

Then, pixels in the column of pixels L13 of the boundary image 13 are compared with pixels at the same corresponding locations of the column of pixels L15 in the local image 15 one by one (step 153). The pixels in the column of pixels L13 of the boundary image 13 may be corresponding to the pixels in the column of pixels L15 of the local image 15, such that the corresponding pixels will be at the same locations when the transparentized boundary image 13 overlaps the local image 15, i.e., the corresponding pixels overlap each other. Here, the pixel values of the pixels in the column of pixels L13 of the boundary image 13 and the corresponding pixels in the column of pixels L15 of the local image 15 are compared sequentially.

Then, the pixel values of the corresponding pixels are counted to obtain the association value of the boundary image 13 and the local image 14 (step 155).

Here, the method for real-time prompting a stitching degree of a panoramic image according to the present invention may be built in a memory of the digital image pickup device 10 through a software or firmware program, and may be implemented by executing the built-in software or firmware program by the digital pick up device 10. In addition to the screen 11, the digital image pickup device 10 may further include an image pickup module, a memory, and a processor. The image pickup module may be used to shoot the first image 12 and the second image 14. One or more memories may be provided. The memory may be used to store the shot first image 12 and second image 14, various predetermined values (e.g., the threshold vale and the predetermined value), executable programs needed by the processor to perform various operations and processing, and images and values and other data that need to be registered in the operation process of the processor (e.g., the boundary image of the first image, the second image, the image blocks, the feature values, the accumulative value and the pixel values). One or more processors may be provided. The processor may be used to process and execute image detecting, image capturing, image merging, image components quantification, association value calculation, displaying, and other operations.

To sum up, when the method for real-time prompting a stitching degree of a panoramic image according to the present invention is applied to a digital image pickup device, in shooting, the digital image pickup device can display a prompt signal to provide a user with a message of the stitching effect of a previous image and an image to be shot, so as to increase the successful rate of producing a panoramic image, and greatly reduce a probability of failure of the user shooting the panoramic image.

What is claimed is:

1. A method for real-time prompting a stitching degree of a panoramic image, applied to a digital image pickup device, wherein the digital image pickup device storing a first image shot previously, the method comprising:
   dividing the first image into a plurality of image blocks;
   quantifying an image component of each of the image blocks to a feature value;
   accumulating the feature values in a sequence starting from the boundary of the first image to obtain an accumulative value;
   merging at least one of the image blocks, which corresponds to the corresponding accumulated feature value, according to the accumulative value to obtain the boundary image;
   detecting a second image;
   merging the boundary image with a local image of the second image;
   displaying the second image after the merging on a screen of the digital image pickup device, wherein the boundary image overlaps the local image of the second image;
   calculating an association value of the boundary image and the local image; and
   displaying a prompt signal corresponding to the association value on the screen of the digital image pickup device.

2. The method for real-time prompting a stitching degree of a panoramic image according to claim 1, wherein the step of quantifying the image component of each of the image blocks to the feature value comprises quantifying a high frequency component of each of the image blocks to the feature value.

3. The method for real-time prompting a stitching degree of a panoramic image according to claim 1, wherein the step of quantifying the image component of each of the image blocks to the feature value comprises quantifying a feature component of each of the image blocks to the feature value.

4. The method for real-time prompting a stitching degree of a panoramic image according to claim 1, wherein the step of merging at least one of the image blocks, which corresponds to the corresponding accumulated feature value according to the accumulative value, to obtain the boundary image comprises:
   when the accumulative value reaches a predetermined value, merging the at least one image block corresponding to the accumulated feature value to the boundary image.

5. The method for real-time prompting a stitching degree of a panoramic image according to claim 1, wherein the step of calculating the association value of the boundary image and the local image comprises:
   analyzing at least one feature point of the boundary image and at least one feature point of the local image;
   comparing the at least one feature point of the boundary image and the at least one feature point of the local image to obtain a same feature point of the boundary image and the local image; and
   generating the association value according to the same feature point obtained through the comparing.

6. The method for real-time prompting a stitching degree of a panoramic image according to claim 1, wherein the step of calculating the association value of the boundary image and the local image comprises:
   obtaining a column of pixels of the local image;
   obtaining a column of pixels of the boundary image corresponding to the obtained column of pixels of the local image, wherein the column of pixels of the boundary image after the merging overlaps the obtained column of pixels of the local image;
   comparing a pixel value of each of the pixels in the obtained column of pixels of the local image with a pixel value of the pixel in a same corresponding location in the obtained column of pixels of the boundary image; and
   counting comparison results of the pixel values to obtain the association value of the boundary image and the local image.

7. The method for real-time prompting a stitching degree of a panoramic image according to claim 1, wherein the step of merging the boundary image and the local image of the second image comprises:
   converting the boundary image to a monochromatic image; and
   merging the monochromatic boundary image and the local image of the second image.

* * * * *